(12) United States Patent
Gordon et al.

(10) Patent No.: US 9,836,973 B2
(45) Date of Patent: Dec. 5, 2017

(54) SELECTIVELY CONTROLLING A SELF-DRIVING VEHICLE'S ACCESS TO A ROADWAY

(71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/007,335

(22) Filed: Jan. 27, 2016

(65) Prior Publication Data
US 2017/0213458 A1  Jul. 27, 2017

(51) Int. Cl.
G05D 1/00 (2006.01)
G08G 1/097 (2006.01)
(Continued)

(52) U.S. Cl.
CPC ............. *G08G 1/097* (2013.01); *E01F 13/04* (2013.01); *E01F 13/06* (2013.01); *E01F 13/10* (2013.01);
(Continued)

(58) Field of Classification Search
CPC . E01F 13/10; E01F 13/04; E01F 13/06; E01F 13/048; E01F 13/046
See application file for complete search history.

(56) References Cited

U.S. PATENT DOCUMENTS 4,665,395 A * 5/1987 Van Ness ............ G07C 9/00111
340/5.25
4,908,988 A  3/1990 Yamamura et al.
(Continued)

FOREIGN PATENT DOCUMENTS

CN  1135063  11/1996
CN  2349068 Y  11/1999
(Continued)

OTHER PUBLICATIONS

U.S. Appl. No. 14/855,731 Non-Final Office Action dated Apr. 15, 2016.
(Continued)

*Primary Examiner* — Jelani Smith
*Assistant Examiner* — Jordan S Fei
(74) *Attorney, Agent, or Firm* — Law Office of Jim Boice

(57) ABSTRACT

A processor-implemented method selectively controls a self-driving vehicle's access to a roadway. A vehicle interrogation hardware device receives an autonomous capability signal from an approaching self-driving vehicle. One or more processors compare predefined roadway conditions to current roadway conditions of the access-controlled roadway. In response to the predefined roadway conditions matching the current roadway conditions of the access-controlled roadway within a predetermined range, the processor(s) determine whether the level of autonomous capability of the approaching self-driving vehicle is adequate to safely maneuver the approaching self-driving vehicle through the current roadway conditions of the access-controlled roadway. In response to determining that the level of autonomous capability of the self-driving vehicle is adequate to safely maneuver the approaching self-driving vehicle through the current roadway conditions of the access-controlled roadway, an automatic barricade control-
(Continued)

ling device positions an automatic barricade to provide the approaching self-driving vehicle with access to the access-controlled roadway.

20 Claims, 7 Drawing Sheets

(51) Int. Cl.
  *E01F 13/04* (2006.01)
  *E01F 13/06* (2006.01)
  *E01F 13/10* (2006.01)
(52) U.S. Cl.
  CPC .......... *G05D 1/0088* (2013.01); *E01F 13/046* (2013.01); *E01F 13/048* (2013.01)

(56) References Cited

U.S. PATENT DOCUMENTS

| | | |
|---|---|---|
| 5,975,791 A | 11/1999 | McCulloch |
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,190,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,509,982 B2 | 8/2013 | Montemerlo et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 * | 3/2014 | Aldasem ............. E01F 13/08 256/13.1 |
| 8,786,461 B1 | 7/2014 | Daudelin |
| 8,793,046 B2 | 7/2014 | Lombrozo et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B2 | 12/2014 | Ferguson et al. |
| 8,924,150 B2 | 12/2014 | Tsimhoni et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,286,520 B1 | 3/2016 | Lo et al. |
| 9,305,411 B2 | 4/2016 | Ricci |
| 9,317,033 B2 | 4/2016 | Ibanez-Guzman et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,628,975 B1 | 4/2017 | Watkins et al. |
| 9,646,496 B1 | 5/2017 | Miller |
| 2002/0026841 A1 | 3/2002 | Svendsen |
| 2003/0065572 A1 | 4/2003 | McNee et al. |
| 2003/0076981 A1 | 4/2003 | Smith et al. |
| 2004/0078133 A1 | 4/2004 | Miller |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2009/0094109 A1 | 4/2009 | Aaronson et al. |
| 2009/0248231 A1 | 10/2009 | Kamiya |
| 2009/0313096 A1 | 12/2009 | Kaga |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0035250 A1 | 2/2011 | Finucan |
| 2011/0077807 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0139756 A1 * | 6/2012 | Djurkovic ............. G08G 1/04 340/905 |
| 2012/0277947 A1 | 11/2012 | Boehringer et al. |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |

(56) References Cited

U.S. PATENT DOCUMENTS

| | | | |
|---|---|---|---|
| 2014/0358353 A1 | 12/2014 | Ibanez-Guzman et al. | |
| 2015/0006005 A1 | 1/2015 | Yu et al. | |
| 2015/0006014 A1 | 1/2015 | Wimmer et al. | |
| 2015/0026092 A1 | 1/2015 | Abboud et al. | |
| 2015/0035685 A1 | 2/2015 | Strickland et al. | |
| 2015/0051778 A1 | 2/2015 | Mueller | |
| 2015/0057891 A1 | 2/2015 | Mudalige et al. | |
| 2015/0062340 A1 | 3/2015 | Datta et al. | |
| 2015/0062469 A1 | 3/2015 | Fleury | |
| 2015/0066282 A1 | 3/2015 | Yopp | |
| 2015/0066284 A1 | 3/2015 | Yopp | |
| 2015/0070178 A1 | 3/2015 | Kline | |
| 2015/0095190 A1 | 4/2015 | Hammad et al. | |
| 2015/0120331 A1 | 4/2015 | Russo et al. | |
| 2015/0134178 A1 | 5/2015 | Minoiu-Enache | |
| 2015/0141043 A1 | 5/2015 | Abramson | |
| 2015/0149021 A1 | 5/2015 | Duncan et al. | |
| 2015/0160019 A1 | 6/2015 | Biswal et al. | |
| 2015/0166059 A1 | 6/2015 | Ko | |
| 2015/0175070 A1 | 6/2015 | Attard et al. | |
| 2015/0178998 A1 | 6/2015 | Attard et al. | |
| 2015/0196256 A1 | 7/2015 | Venkatraman et al. | |
| 2015/0232065 A1 | 8/2015 | Ricci et al. | |
| 2015/0293994 A1 | 10/2015 | Kelly | |
| 2015/0338226 A1 | 11/2015 | Mason et al. | |
| 2015/0339639 A1 | 11/2015 | Choe | |
| 2016/0001781 A1 | 1/2016 | Fung et al. | |
| 2016/0026182 A1 | 1/2016 | Boroditsky et al. | |
| 2016/0075512 A1 | 3/2016 | Lert, Jr. | |
| 2016/0078695 A1 | 3/2016 | McClintic et al. | |
| 2016/0078758 A1 | 3/2016 | Basalamah | |
| 2016/0090100 A1 | 3/2016 | Oyama et al. | |
| 2016/0139594 A1 | 5/2016 | Okumura et al. | |
| 2016/0140507 A1 | 5/2016 | Stevens et al. | |
| 2016/0176409 A1 | 6/2016 | Kirsch et al. | |
| 2016/0303969 A1 | 10/2016 | Akula | |
| 2016/0334797 A1 | 11/2016 | Ross et al. | |
| 2016/0344737 A1 | 11/2016 | Anton | |
| 2016/0355192 A1 | 12/2016 | James et al. | |
| 2016/0364823 A1 | 12/2016 | Cao | |
| 2017/0010613 A1* | 1/2017 | Fukumoto | G08G 1/096827 |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

P. Mell et al., "The Nist Definition of Cloud Computing", National Institute of Standards and Technology, Information Technology Laboratory, Sep. 2011, pp. 1-7.
Chen S, et al. A crash risk assessment model for road curves. In Proceedings 20th International Technical Conference on the Enhanced Safety of Vehicles., 2007. Lyon, France.
Brownell, "Shared Autonomous Taxi Networks: An Analysis of Transportation Demand in NJ and a 21st Century Solution for Congestion", Dissertation, Princeton University, 2013, pp. 1-122.
Sessa et al., "Blueprint of Alternative City Cyber-Mobility Take-U Scenarios", Seventh Framework Programme Theme SST.Mar. 1-4, 2012, Automated Urban Vehicles Collaborative Project—Grant Agreement No. 314190, 2013, pp. 1-63.
Lutin et al., "The Revolutionary Development of Self-Driving Vehicles and Implications for The Transportation Engineering Profession", ITE Journal 83.7, 2013, pp. 28-32.
A. Hars, "Self-Driving Cars: The Digital Transformation of Mobility", Marktplatze Im Umbruch, Springer Berlin Heidelberg, 2015, pp. 539-549.
Jimenez et al.; "Autonomous collision avoidance system based on accurate knowledge of the vehicle surroundings"; Inst Engineering Technology-IET; IET Intelligent Transport Systems vol. 9, No. 1, pp. 105-117; 2015; England.
Anonymous, "Avoiding Crashes With Self-Driving Cars: Today's Crash-Avoidance Systems Are The Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.
C. Berger et al., "COTS-Architecture With a Real-Time OS for a Self-Driving Miniature Vehicle", Safecomp 2013—Workshop ASCOMS of The 32nd International Conference on Computer Safety, Reliability and Security, Sep. 2013, Toulouse, France, pp. 1-13.
A. Abkowitz, "Do Self-Driving Cars Spell Doom for Auto Insurers?", Bloomberg L.P., Sep. 10, 2014, pp. 1-2.
X. Jardin, "Terrifying Dashcam Video Captures Distracted Teen Drivers Crashing While Goofing Off", Boing Boing, www/boingboing.net, Mar. 26, 2015, 1 Page.
M. Fox, "Self-Driving Cars Safer Than Those Driven by Humans: Bob Lutz", CNBC, www.cnbc.com, Sep. 8, 2014, 1 Page.
Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.
Smith, Mark. "Inovations: Emerging Trends in The Wheelchair Market." New Mobility Magazine, Aug. 1, 2014. Web. <http://www.newmobility.com/2014/08/emerging-trends/>.
Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.
Anonymous, 'System and Method to Target Advertisements for the Right Focus Group'. ip.com, No. 000218285, May 31, 2012, pp. 1-2.
Anonymous, "Car Built-In Mechanism to Enforce Mandatory Self-Driving Mode", ip.com, No. 300234916, Feb. 14, 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
T.Vanderbilt, "Let the Robot Drive: The Autonomous Car of the Future is Here", Wired Magazine, Conde Nast, www.wired.com, Jan. 20, 2012. pp. 1-34.
U.S. Appl. No. 14/887,388, filed Oct. 20, 2015.
E. Lehrer, "The Insurance Implications of Google's Self-Driving Car", Insurance Journal, Right Street Bloh=G, May 28, 2014, pp. 1-2.

(56) References Cited

OTHER PUBLICATIONS

Anonymous, "Self-Driving Cars and Insurance", Insurance Information Institute, Inc., Feb. 2015, pp. 1-3.
Anonymous, "Diagnostics Mechanism for Self-Driving Cars to Validate Self-Driving Capabilities", ip.com, Jun. 6, 2014, pp. 1-5. ip.com.

* cited by examiner

SELECTIVELY CONTROLLING A SELF-DRIVING VEHICLE'S ACCESS TO A ROADWAY

BACKGROUND

The present disclosure relates to the field of vehicles, and specifically to the field of self-driving vehicles. Still more specifically, the present disclosure relates to the field of selectively controlling a self-driving vehicle's access to a particular roadway based on the autonomous capabilities of the self-driving vehicle.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a processor-implemented method and/or computer program product selectively controls a self-driving vehicle's access to a roadway. A vehicle interrogation hardware device receives an autonomous capability signal from an approaching self-driving vehicle, which is approaching an access-controlled roadway. Access to the access-controlled roadway is limited to self-driving vehicles that are deemed qualified to travel on the access-controlled roadway, and the autonomous capability signal describes a level of autonomous capability of the approaching self-driving vehicle for maneuvering through predefined roadway conditions. One or more processors compare the predefined roadway conditions to current roadway conditions of the access-controlled roadway. In response to the predefined roadway conditions matching the current roadway conditions of the access-controlled roadway within a predetermined range, the processor(s) determine whether the level of autonomous capability of the approaching self-driving vehicle is adequate to safely maneuver the approaching self-driving vehicle through the current roadway conditions of the access-controlled roadway. In response determining that the level of autonomous capability of the self-driving vehicle is adequate to safely maneuver the approaching self-driving vehicle through the current roadway conditions of the access-controlled roadway, an automatic barricade controlling device positions an automatic barricade to provide the approaching self-driving vehicle with access to the access-controlled roadway.

In an embodiment of the present invention, a roadway access-controlling station includes a supervisory computer, a vehicle interrogation hardware device, and an automatic barricade controlling device. The vehicle interrogation hardware device receives an autonomous capability signal from an approaching self-driving vehicle that is approaching an access-controlled roadway. Access to the access-controlled roadway is limited to self-driving vehicles that are deemed qualified to travel on the access-controlled roadway, and the autonomous capability signal describes a level of autonomous capability of the approaching self-driving vehicle for maneuvering through predefined roadway conditions. The supervisory computer compares the predefined roadway conditions to current roadway conditions of the access-controlled roadway. In response to the predefined roadway conditions matching the current roadway conditions of the access-controlled roadway within a predetermined range, the supervisory computer determines whether the level of autonomous capability of the approaching self-driving vehicle is adequate to safely maneuver the approaching self-driving vehicle through the current roadway conditions of the access-controlled roadway. The automatic barricade controlling device, in response the supervisory computer determining that the level of autonomous capability of the self-driving vehicle is adequate to safely maneuver the approaching self-driving vehicle through the current roadway conditions of the access-controlled roadway, positions an automatic barricade to provide the approaching self-driving vehicle with access to the access-controlled roadway.

DETAILED DESCRIPTION

Figure 1:
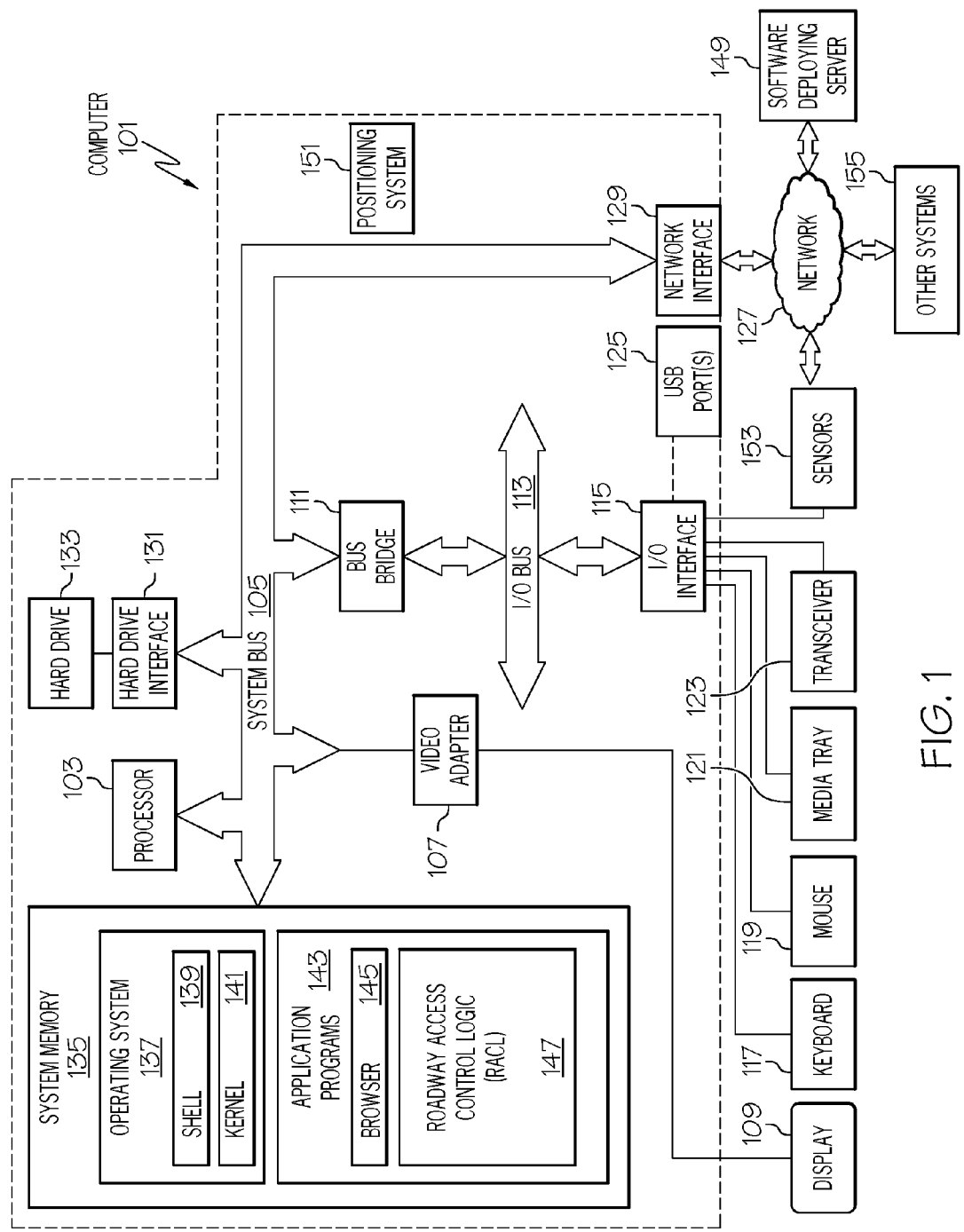
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a system and method that regulates entry to an "SDV-only road" by a barricade (e.g. a gate arm), which is removed (or lifted) only when an SDV authenticates its mode and/or abilities to a controller of the barricade. Further disclosed is the lowering of the barricade whenever a human-operated vehicle and/or an inadequate SDV attempts to enter the SDV-only road.

The pervasiveness of SDVs may lead some political/governmental entities (which are in charge of transportation infrastructures) to design roads that require superhuman (i.e., autonomous) driving abilities. That is, such roads may be devoid of guardrails, traffic lights, have very narrow lanes, etc., thus making them cheaper. While it would be unsafe for a driver of ordinary skill to drive on such a road, a properly set up SDV could safely drive on such a road and/or at speeds that would be unsafe for human drivers. In order to keep unqualified SDVs and/or human drivers off such roadways, barricades would be needed to block access for non-qualified SDVs (i.e., SDVs that do not have the autonomous capabilities to handle the roadway conditions or human drivers that are not qualified to drive on the roadway).

Disclosed herein is a method and a system that utilizes/comprises a road barricade (e.g., an electronic gate arm) and a receiver for receipt of an SDV mode signal from an SDV. In response to receiving a signal describing whether or not the vehicle is in an (adequate) autonomous mode, the barricade deploys or undeploys.

The SDV may be in manual mode or self-driving mode. A standard car (i.e., a vehicle that is not able to drive in a fully autonomous mode) would not, for example, transmit an SDV signal to a control system, and thus will be denied access to roads or special lanes that are appropriate for certain SDVs, which would be better able to handle roads that are narrower or that have other attributes that make them too difficult to handle by human drivers (but that are relatively safe for SDVs). The barrier, barricade, or gate arm may control access to not only a roadway, but also special lane on a roadway, a tunnel, a ferry access lane, a parking spot, a car-wash lane, a service bay in a garage, etc. If desired, the gate or barrier may provide information to drivers (e.g., in the form of an electronic message displayed on a visual display next to the vehicle or inside the cabin of the vehicle) advising the drivers of why they are being denied access. Examples of such an electronic message when trying to access an SDV-only roadway may be "You are not driving an SDV" or "You are not in SDV (automatic/autonomous) mode."

The road barricade system presented herein may take into account additional factors, such as current or forecast road conditions, weather, daylight levels (in which a driver can or cannot see well), road maintenance, fog level, falling rocks, traffic volume, etc., and then compute a risk level R that is used to determine gate raising and lowering for SDVs and standard vehicles.

The road barricade system may learn about particular cars, classes of cars, car features (e.g., snow tires), particular drivers, particular road conditions, a history of accidents, etc., and then use this information/learning in the decision to raise or lower a gate arm. For example, research has shown that a tight road curve radii will increase the related risk rate, particularly when the vehicle is being manually driven. Thus, the system will be adamant that only SDVs are allowed to enter roadways having tightly-curved sections.

The road barricade system may take into account SDV features (e.g., software version, sensors, processor speed, communication abilities and current signal strength to access artificial intelligence (AI) features in the cloud, superhuman ability levels, etc.) when deciding whether or not to allow an SDV access to a roadway. The system will match the SDV features to current real-time roadway conditions, thus matching a particular SDV to a particular roadway. That is, in one or more embodiments of the present invention, the road barricade system will take into account SDV software version and software patches. In other words, the barricade system (e.g., part of and/or under the control of the roadway access controlling station 206 shown in FIG. 2) interrogates the particular SDV to determine what version/level of software (e.g., that controls components shown in FIG. 3 related to braking or other decision-making) is currently installed on that particular SDV. If the currently installed software (which controls the SDV's braking, steering, etc.) is obsolete (e.g., has been replaced with a newer version and/or is more than, for example, one year old), then that SDV will not be allowed to travel on a particular access-controlled roadway (e.g., access-controlled roadway 208 shown in FIG. 2).

The road barricade system may take into account the presence of pedestrians and/or animals near a road or forecast to be near a road in making the decision as to whether or not to allow a certain SDV or a manual vehicle to enter the roadway. For example, if there are numerous pedestrians and/or animals near (or even on) the roadway, then only properly-enabled SDVs may be allowed to drive on that roadway.

The road barricade system may take into account the presence of distracting road noise or other distractions such as road work crews in making the decision as to whether or not to allow a certain SDV or a manual vehicle to enter the roadway. Thus, if there are high levels of distracting road noise (e.g., from work crews, sirens, etc.) that would create a problem for a human driver (but not an autonomous SDV), then autonomous SDVs would be allowed access to the noisy roadway, but vehicles being controlled by humans would not.

The road barricade system may take into account the increased speed with which SDVs might travel on a particular stretch of roadway, therefore limiting travel only to SDVs.

The road barricade system may take into account the terrain for an off-road trail, a dirt road (particularly when wet), and/or a gravel road and determine that it is too difficult for a driver with ordinary skill to travel on it, and thus permit only SDVs to travel on such off-road trails, dirt roads, and/or gravel roads.

The barricade system may manage multiple barricades at a given time, and open appropriate barricades in order to guide the SDV or human operated vehicle to the correct route and/or lane based on the car condition and other factors (e.g., current roadway conditions).

Thus, one or more embodiments of the present invention present a method and system that includes a road barricade (e.g., an electronic gate arm) and a system to receive an SDV mode signal from an SDV such that, based on receiving the SDV mode signal, the barricade deploys or undeploys.

In one or more embodiments of the present invention, the road barricade system takes into account the current level of traffic and types of traffic control devices. For example, if the traffic on a roadway is heavy and/or there are no traffic control lights at intersections, then manually driven cars would not being able to handle such traffic and intersections safely, and are not be permitted to travel on that roadway. However, properly set up SDVs can handle such conditions, and are allowed to travel on that roadway.

In one or more embodiments of the present invention, the road barricade system takes into account the current level of traffic on multilane highways or roadways and may control access to the entrances and exits (i.e., on-ramps and off-ramps) of a highway if the density of traffic is determined to be too high. Thus, traffic flow can be improved, and traffic jams avoided, in situations of traffic congestion due to high density of traffic, collisions, or the presence of emergency vehicles. For example, if an SDV is determined to be capable of quickly merging into the remaining available lanes when a traffic lane is closed, it may be allowed access to the highway on-ramp. Similarly, if an SDV is determined to be able to appropriately accelerate past emergency vehicles without hesitation (i.e., without "rubbernecking" or engaging in other counterproductive or dangerous driving behavior) it may be allowed access to a roadway on-ramp, since the SDV will not obstruct the flow of traffic already on the roadway.

In one or more embodiments of the present invention, the road barricade system may take into account the presence of an SDV when allowing access to or exit from a toll road. For example, if multiple vehicles attempt to use a particular exit on a toll road, thus creating a bottleneck when the multiple vehicles merge into fewer lanes near the particular exit, the barricade system may allow only an approaching SDV that is capable of exiting per predetermined criteria (i.e., at a certain speed, within a certain proximity of other vehicles, etc.), to use the particular toll road exit. Alternatively, only SDVs that match the predetermined exiting criteria may be allowed to enter/access the toll road in the first place, thus altogether eliminating congestion due to hesitation, poor lane-changing skills, etc.

In one or more embodiments of the present invention, the road barricade system will take into account whether a given human driven car is a member of a particular cohort of car types in determining whether or not it should be allowed on the SDV-only section. That is, even if manually driven, if a highly-skilled driver (according to the driver's profile) is driving a high performance vehicle (e.g., a highly responsive sports car), then that driver/vehicle may be allowed on the SDV-only roadway, while slower and/or less responsive vehicles (e.g., semi tractor-trailer rigs) are not.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 (e.g., SDVs) shown in FIG. 1, and/or supervisory computer 201, vehicle interrogation hardware device 208, and or automatic barricade controlling device 210 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
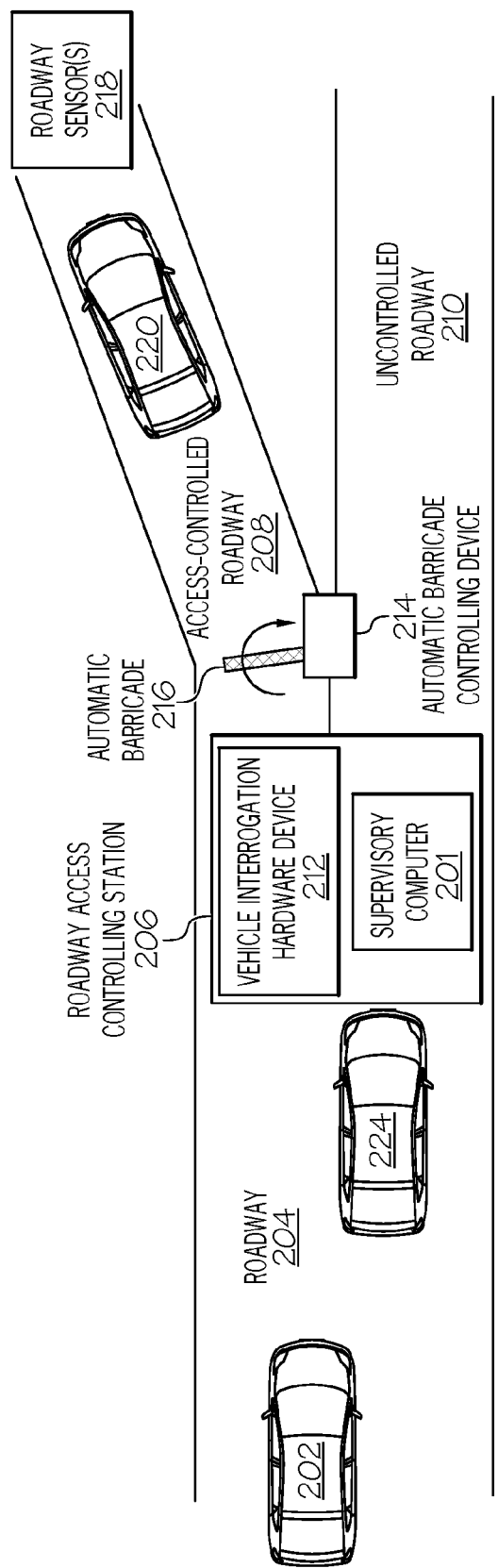
FIG. 2 illustrates an exemplary self-driving vehicle (SDV) approaching a roadway access-controlling station that physically controls access to an access-controlled roadway.

As depicted, computer 101 is able to communicate with a software deploying server 149 and/or other systems 155 (e.g., establish communication with SDV 202 and/or roadway access-controlling station 206 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, a dedicated radio-frequency (RF) network, a near-field communication (NFC) channel, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Roadway Access Control Logic (RACL) 147. RACL 147 includes code for implementing the processes described below, including those described in FIGS. 2-4. In one embodiment, computer 101 is able to download RACL 147 from software deploying server 149, including in an on-demand basis, wherein the code in RACL 147 is not downloaded until needed for execution. In one embodiment of the present invention, software deploying server 149 performs all of the functions associated with the present invention (including execution of RACL 147), thus freeing computer 101 from having to use its own internal computing resources to execute RACL 147.

Also within computer 101 is a positioning system 151, which determines a real-time current location of computer 101 (particularly when part of an SDV as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101, including when incorporated into a vehicle. More specifically, sensors 153 are able to detect other vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary self-driving vehicle (SDV) 202, depicted traveling along a roadway 204, is approaching a roadway access-controlling station 206.

Roadway access-controlling station 206 controls which vehicles are allowed to travel on an access-controlled roadway 208 (i.e., a roadway that is restricted to use by SDVs that meet certain performance requirements) and which vehicles must travel on an uncontrolled roadway 210 (e.g., for use by any vehicle, including manually-controlled vehicles, SDVs that do not meet the requirements to travel along access-controlled roadway 208, etc.).

While access-controlled roadway 208 is depicted as a highway, it is to be understood that in various embodiments of the present invention access-controlled roadway 208 may be any type of roadway surface capable of supporting the weight of a vehicle, such as a parking lot, a particular space in a parking lot, a tunnel, a particular lane in a roadway, a garage, a particular service bay in a maintenance garage, a bridge, an unpaved (off-road) pathway, etc.

As the SDV 202 approaches the roadway access-controlling station 206, a vehicle interrogation hardware device 212 interrogates an on-board computer (e.g., SDV on-board computer 301 described below in FIG. 3) on the SDV 202. This interrogation results in a signal from the SDV 202 that describes the level of ability of SDV 202 to operate in an autonomous mode. If this ability is sufficient to safely travel on the access-controlled roadway 208, then the supervisory computer 201 (analogous to computer 101 shown in FIG. 1) sends a signal to the automatic barricade controlling device 214 to raise (or otherwise move) the automatic barricade 216, thus allowing the SDV 202 to enter the access-controlled roadway 208. This decision may be based on current conditions of the access-controlled roadway 208.

Current conditions of the access-controlled roadway 208, including weather conditions, traffic conditions, construction events, mishap events, etc., can be determined and transmitted by roadway sensor(s) 218 and/or other SDVs to the supervisory computer 201 and/or directly to SDVs (e.g., SDV 202) themselves. That is, supervisory computer 201 is able to receive sensor readings from other SDVs, such as SDV 220, and/or roadway sensor(s) 218 in order to determine current roadway conditions of access-controlled roadway 208. Thus, various on-board sensors on SDV 220 (see exemplary sensors shown in FIG. 3 for SDV 202) and/or roadway sensor(s) 208 are mechanical, visual, and/or electrical sensors that are able to detect the number and speed of vehicles traveling on the access-controlled roadway 208, the amount and/or type of precipitation on the access-controlled roadway 208, the temperature of the access-controlled roadway 208 and/or ambient air around the access-controlled roadway 208, the movement of vehicles traveling along access-controlled roadway 208, etc.), as well as information received from sensors and/or on-board computers within SDV 202 and/or SDV 220, and/or from information received by an information service (e.g., a weather station). In one or more embodiments, these roadway conditions are utilized not only in the decision as to whether or not to allow a particular SDV to access the access-controlled roadway 208, but also are utilized in the decision regarding into which operational/driving mode the SDV 202 should be placed.

In accordance with one or more embodiments of the present invention, SDV 202 may be driven in "manual mode" or "autonomous mode", each of which are referred to herein as an operational mode or a driving mode, where the terms "operational mode" and "driving mode" are synonymous and interchangeable.

As used and described herein, "manual mode" is defined as an SDV being at least partially under the input control of a human driver. That is, if SDV 202 is being steered by a human driver but has cruise control activated, then it is in manual mode, since SDV 202 is partially under the input control (steering) of the human driver. Thus, while in manual mode, even SDV 202 can operate as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 (shown in FIG. 3) by the driver result in output signals that control the SDV vehicular physical control mechanisms 305 (e.g., the engine throttle, steering mechanisms, braking systems, turn signals, etc.).

Figure 3:
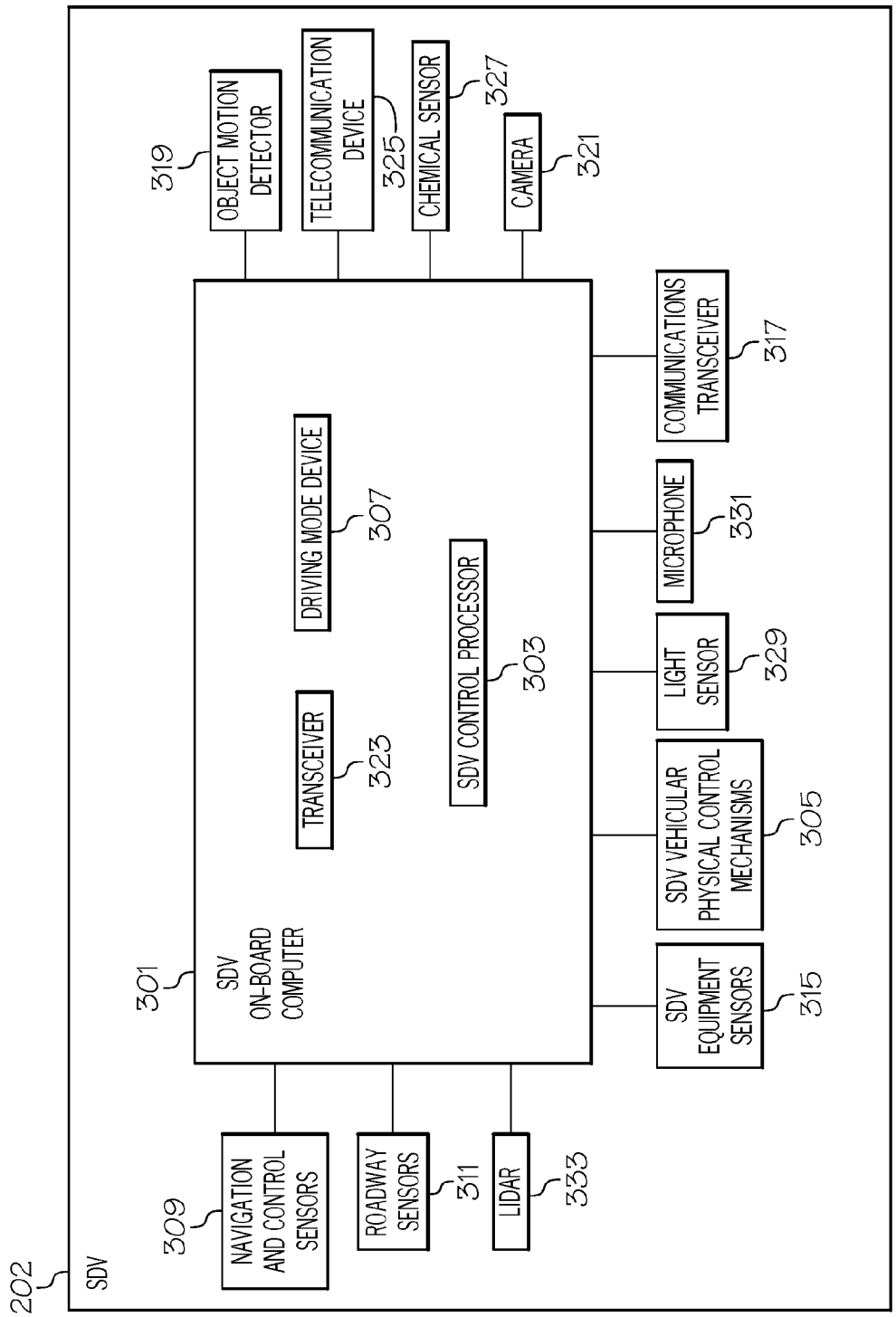
FIG. 3 depicts additional detail of hardware within an SDV.

As used and described herein, "autonomous mode" is defined as an SDV being totally controlled by hardware/software logic (e.g., SDV on-board computer 301 and/or driving mode device 307 and/or SDV control processor 303 shown in FIG. 3) without inputs from the human driver under roadway and/or SDV conditions that have been predetermined to be normal (i.e., "nominal"). That is, if steering, braking, throttle control, obstacle/vehicle avoidance, etc. are all under the control of hardware/software logic such as the SDV on-board computer 301 shown in FIG. 3, then SDV 202 is in an autonomous mode.

Thus, if the sensors provide data that indicates that SDV 202 can be driven safely in manual mode while traveling on access-controlled roadway 208, then the roadway access-controlling station 206 will/may direct the SDV on-board computer 301 and/or driving mode device 307 and/or SDV control processor 303 shown in FIG. 3 to place the SDV in manual mode. However, if (and more likely) the sensors provide data that indicates that SDV 202 cannot be driven safely in manual mode while traveling on access-controlled roadway 208, then the roadway access-controlling station 206 will/may direct the SDV on-board computer 301 and/or driving mode device 307 and/or SDV control processor 303 shown in FIG. 3 to place the SDV in autonomous mode before entering the access-controlled roadway 208.

Referring now to FIG. 3, additional details of one or more embodiments of the SDV 202 are presented. The features shown in FIG. 3 may also be implemented in SDV 202 as well as SDV 220.

As shown in FIG. 3, SDV 202 has an SDV on-board computer 301 that controls operations of the SDV 202. According to directives from a driving mode device 307, the SDV 202 can be selectively operated in manual mode or autonomous mode. In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, since the SDV on-board computer 301 processes inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (LIDAR 333 shown in FIG. 3) or Laser Detection and Ranging (LADAR) system that measures the time it takes to receive back the emitted electromagnetic radiation (e.g., light), and/or evaluates a Doppler shift (i.e., a change in frequency to the electromagnetic radiation that is caused by the relative movement of the SDV 202 to objects being interrogated by the electromagnetic radiation) in the received electromagnetic radiation from when it was transmitted. In this way, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 206 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 206 is using light sensors.

Similarly, a dedicated camera 321 can be trained on access-controlled roadway 208, in order to provide photographic images describing a condition of the access-controlled roadway 208 shown in FIG. 2. Thus, images from the camera 321 may be used by the roadway access-controlling station 206 shown in FIG. 2 when determining the condition of access-controlled roadway 208, in order to determine which, if any, vehicles are allowed to access the access-controlled roadway 208. That is, if the photos show unduly hazardous conditions (e.g., a wreck, a rockslide, a snowdrift, etc.), then access to the access-controlled roadway 208 may be limited to only SDVs capable of maneuvering around such problems.

Similarly, a dedicated object motion detector 319 (e.g., a radar transceiver capable of detecting Doppler shifts indicative of the speed and direction of movement of other vehicles and/or fixed objects) can be trained on access-controlled roadway 208, in order to detect the movement of SDV 220. Thus, signals from the object motion detector 319 can be used by the roadway access-controlling station 206 shown in FIG. 2 to determine the condition of access-controlled roadway 208, in order to determine which, if any, vehicles are allowed to access the access-controlled roadway 208. That is, if traffic is moving very fast, then only SDVs deemed capable of keeping up with such traffic may be allowed to enter the access-controlled roadway 208.

In one or more embodiments of the present invention, also within the SDV 202 are SDV equipment sensors 315. For example, SDV equipment sensors 315 may include cameras aimed at tires on the SDV 202 to detect how much tread is left on the tires. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, signals from the SDV equipment sensors 315 can be used by the roadway access-controlling station 206 shown in FIG. 2 for determining the condition of access-controlled roadway 208, in order to determine which, if any, vehicles are allowed to access the access-controlled roadway 208. That is, if the SDV 202 is in poor condition, then it will not be allowed to enter the access-controlled roadway 208, even if designed to handle the current roadway conditions of access-controlled roadway 208.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within SDV 202 is at least one light sensor 329, which is able to detect the amount of light (from the sun, moon, stars, streetlights, vehicular headlights, etc.) on the access-controlled roadway 208. Thus, signals from the light sensor 329 can be used by the roadway access-controlling station 206 shown in FIG. 2 for determining the condition of access-controlled roadway 208, in order to determine which, if any, vehicles are allowed to access the access-controlled roadway 208. That is, if the access-controlled roadway 208 is especially dark, then only SDVs capable of driving in such dark conditions (or manual vehicles equipped with an infrared heads-up display) will be allowed to enter the access-controlled roadway 208.

In one or more embodiments of the present invention, also within SDV 202 and/or SDV 220 is at least one microphone 331, which is able to detect the ambient sounds (e.g., sirens, horns, tire noise, etc.) on the access-controlled roadway 208. Thus, signals from the microphone 331 can be used by the roadway access-controlling station 206 shown in FIG. 2 for determining the condition of access-controlled roadway 208 and/or the condition of SDV 202 in order to determine which, if any, vehicles are allowed to access the access-controlled roadway 208. For example, the microphone 331 may detect the presence of multiple sirens, and therefore prevent SDVs that are incapable of safely getting out of the way of emergency vehicles from entering the access-controlled roadway 208.

In one or more embodiments of the present invention, also within SDV 202 is at least one chemical sensor 327, which is able to detect the presence of chemicals (e.g., gasoline fumes, pipeline leaks, etc.) on the access-controlled roadway 208. Thus, readings from chemical sensor 327 can be used by the roadway access-controlling station 206 shown in FIG. 2 for determining the condition of access-controlled roadway 208, in order to determine which, if any, vehicles are allowed to access the access-controlled roadway 208. For example, if there is a chemical spill on the access-controlled roadway 208, then no vehicles, including SDVs, may be allowed to enter the access-controlled roadway 208.

Figure 4:
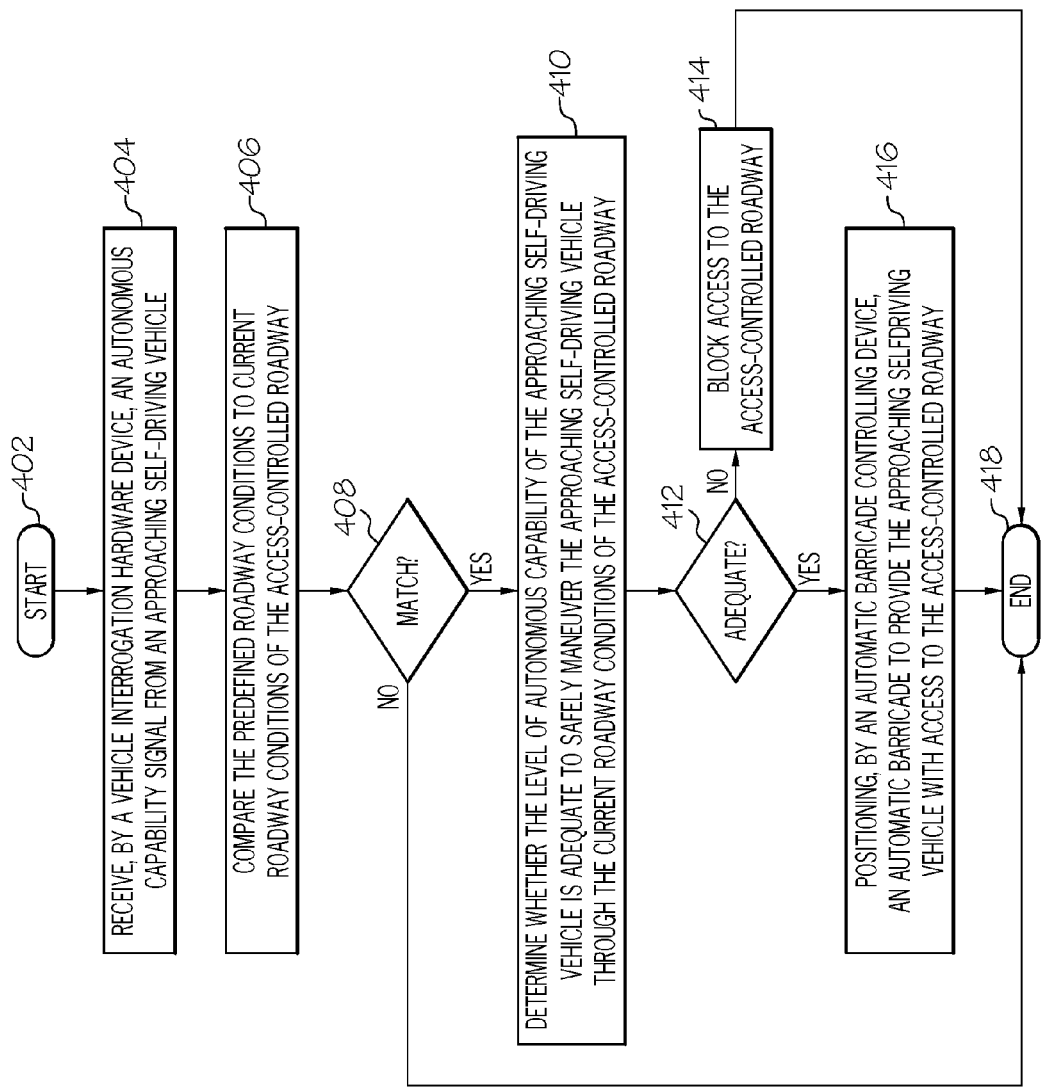
FIG. 4 is a high-level flow chart of one or more steps performed by one or more processors and/or other hardware devices to control a self-driving vehicle's access to a roadway.

With reference now to FIG. 4, a high-level flow chart of one or more steps performed by one or more processors to selectively control a self-driving vehicle's access to a roadway is presented.

After initiator block 402, a vehicle interrogation hardware device (e.g., vehicle interrogation hardware device 212 shown in FIG. 2) receives an autonomous capability signal from an approaching self-driving vehicle (e.g., SDV 202 shown in FIG. 2), as described in block 404. The approaching self-driving vehicle is approaching an access-controlled roadway (e.g., access-controlled roadway 208 shown in FIG. 2). In one or more embodiments of the present invention, access to the access-controlled roadway is limited to self-driving vehicles that are deemed qualified to travel on the access-controlled roadway. That is, in one or more embodiments of the present invention, only SDVs that are designed and set up to handle the current road conditions of the access-controlled roadway are allowed to travel on the access-controlled roadway. In an alternative embodiment of the present invention, manually controlled vehicles may enter the access-controlled roadway, assuming that the driver is qualified (e.g., according to a retrieved profile showing that the driver has the training and experience to handle current road conditions of the access-controlled roadway) and that the manually-controlled vehicle is in proper condition (e.g., has the proper suspension, drive train, tires, etc. needed to handle the roadway conditions of access-controlled roadway 208).

When using the roadway access-controlling station 206 shown in FIG. 2 to control access to certain SDVs, the autonomous capability signal describes a level of autonomous capability of the approaching self-driving vehicle for maneuvering through predefined roadway conditions. For example, the SDV on-board computer 301 shown in FIG. 3 may include a memory that describes the SDV 202 as being able to travel over 100 miles per hour, can negotiate wet curves that have a radius that is less than a predefined limit, has a braking system that is able to stop the SDV 202 in less than 400 feet when traveling at 100 miles per hour, can safely maneuver through heavy traffic (e.g., more than 10 vehicles per linear mile of roadway), etc.

As described in block 406, one or more processors (e.g., part of supervisory computer 201 shown in FIG. 2) compare the predefined roadway conditions to current roadway conditions of the access-controlled roadway. As shown in query block 408, a determination is made as to whether or not the predefined roadway conditions (e.g., abilities of SDV 202) match the current roadway conditions of the access-controlled roadway.

For example, assume that the autonomous capability signal for SDV 202 describes that the SDV 202 is able to safely drive on wet and unlit roads even when there are up to 10 vehicles per linear mile of the roadway. Assume further that the access-controlled roadway 208 is dark and wet. If there are no more than 10 vehicles per linear mile on the access-controlled roadway 208, then SDV 202 is deemed safe to travel on the access-controlled roadway 208. However, if there are 20 vehicles per linear mile on the access-controlled roadway 208, then SDV 202 is not deemed to be safe to travel on the access-controlled roadway 208, since 10 vehicles per linear mile is the limit for SDV 202.

As described in block 410, if there is a match in conditions within a predetermined range (in factors and/or degrees of factors) in query block 408, then the roadway access-controlling station 206 determines whether the level of autonomous capability of the approaching self-driving vehicle is adequate to safely maneuver the approaching self-driving vehicle through the current roadway conditions of the access-controlled roadway (as described above).

As just indicated, the predetermined range may be in "factors" or "degrees of factors". For example, assume that in order to safely travel on a particular roadway, an SDV needs to be able to detect roadway edges without the aid of embedded sensors in the roadway, to "see through" heavy fog, and to come to a stop within 5 seconds when traveling at 100 miles per hour. These three "factors" are therefore what is required of an SDV to travel on that roadway.

"Degrees of factors" are levels of abilities of the factors. For example, assume again that in order to safely travel on a particular roadway, an SDV needs to be able to detect roadway edges without the aid of embedded sensors in the roadway, to "see through" heavy fog, and to come to a stop within 5 seconds when traveling at 100 miles per hour. However, these different factors may be considered at different levels/degrees. For example, the ability to detect roadway edges without the aid of embedded sensors in the roadway may be the ability to stay at least 3 inches from the roadway edge based on this detection, or to stay at least 2 feet from the roadway edge based on this detection. Similarly, the ability to "see through" heavy fog may be the ability to "see through" 100 feet of fog or 300 feet or fog. Similarly, the ability to come to a stop within 5 seconds when traveling at 100 miles per hour may be more stringent (e.g., the ability to come to a stop within 4 seconds) or less stringent (e.g., the ability to come to a stop within 6 seconds). Thus, the system may require a certain "degree of factors" in order to permit the SDV 202 to travel on access-controlled roadway 208.

Thus, the certification/qualification of SDV 202 to travel on access-controlled roadway 208 may be based on basic factors (e.g., the ability to stay in a lane, peer through fog, safely stop autonomously) or certain degrees of factors (e.g., the ability to stay at least 2 feet from a roadway edge, the ability to peer through 300 feet of fog, the ability to stop within 4 seconds).

If the SDV is not deemed adequate to handle the current conditions of the access-controlled roadway 208 (query block 412), then it is prevented from entering the access-controlled roadway 208 (e.g., the automatic barricade in FIG. 2 remains down), as described in block 414. However, if the SDV is deemed to be adequate to handle the current conditions of the access-controlled roadway 208 (query block 412), then it is permitted entrance to the access-controlled roadway 208 (e.g., the automatic barricade 216 in FIG. 2 goes up), as described in block 416.

The flow-chart ends at terminator block 418.

In one embodiment of the presently invention, the vehicle interrogation hardware device 212 shown in FIG. 2 determines that another approaching vehicle (e.g., vehicle 224 shown in FIG. 2) is operating in manual mode. In response to determining that this other approaching vehicle is operating in manual mode, the automatic barricade controlling device 214 positions the automatic barricade 216 to block this other approaching vehicle from accessing the access-controlled roadway 208 (e.g., the automatic barricade 216 in FIG. 2 goes and/or stays down). Alternatively, if the driver of the vehicle 224 is skilled enough (according to his/her driving profile that is accessed by the supervisory computer 201) and the condition/capability of vehicle 224 meets certain predefined ability levels (e.g., power, braking, suspension, etc.) as determined by on-board sensors on vehicle 224, then vehicle 224 may be allowed to enter the access-controlled roadway 208.

As noted above, even though access-controlled roadway 208 is depicted as a highway, in other embodiments of the present invention the access-controlled roadway is a vehicular surface from a group consisting of street, a tunnel, a ferry, a parking spot, a service bay in a maintenance shop, etc.

In an embodiment of the present invention, the roadway access-controlling station 206 receives sensor readings from sensors (e.g., roadway sensor(s) 218 and/or sensors shown in FIG. 3 that are on SDV 220) that monitor the access-controlled roadway 208. These sensor readings describe a current real-time condition of the access-controlled roadway, thus allowing the roadway access-controlling station 206 to determine the current roadway conditions of the access-controlled roadway 208 based on the received sensor readings.

In an embodiment of the present invention, the roadway access-controlling station 206 only allows vehicles (either autonomous SDVs or manually operated vehicles) to enter the access-controlled roadway 208 if other similar vehicles and/or the approaching self-driving vehicle have a good safety record while traveling on the access-controlled roadway 208. Thus, the vehicle interrogation hardware device receives a description of a physical state of the approaching self-driving vehicle (what type of vehicle it is, its current mechanical/maintenance state, etc.). The roadway access-controlling station retrieves an accident history (e.g., from an accident history database in the supervisory computer 201) of other vehicles that have a same physical state as that of the approaching self-driving vehicle (202/224) while traveling on the access-controlled roadway 208. The supervisory computer 201 determines whether the accident history of the other vehicles traveling on the access-controlled roadway exceeds a predetermined limit. In response to the supervisory computer determining that the accident history of the other vehicles exceeds the predetermined limit while traveling on the access-controlled roadway, the automatic barricade controlling device 214 positions the automatic barricade 216 to block the approaching self-driving vehicle from accessing the access-controlled roadway 208.

As described herein, in an embodiment of the present invention the current roadway conditions of the access-controlled roadway include a curve radius of a curve in the access-controlled roadway being less than a predefined value.

As described herein, in an embodiment of the present invention the current roadway conditions of the access-controlled roadway include an absence of guardrails on one or more sections of the access-controlled roadway. Thus, if the access-controlled roadway 208 is missing guardrails on dangerous areas (e.g., next to a cliff), then an appropriately-enabled SDV may safely drive on the access-controlled roadway 208, but a manually operated vehicle cannot safely operate thereon, and will be prevented from entering the access-controlled roadway 208.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
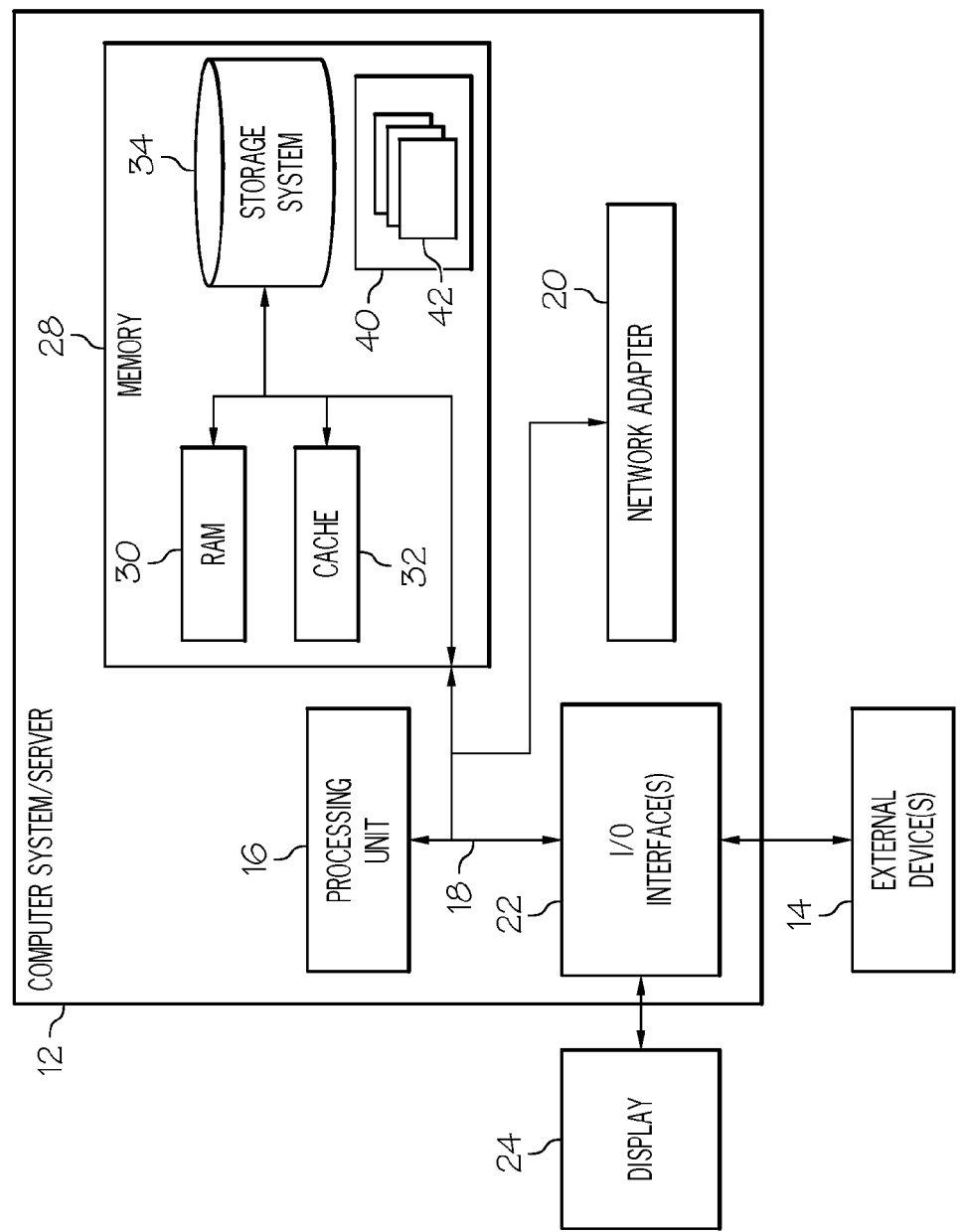
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
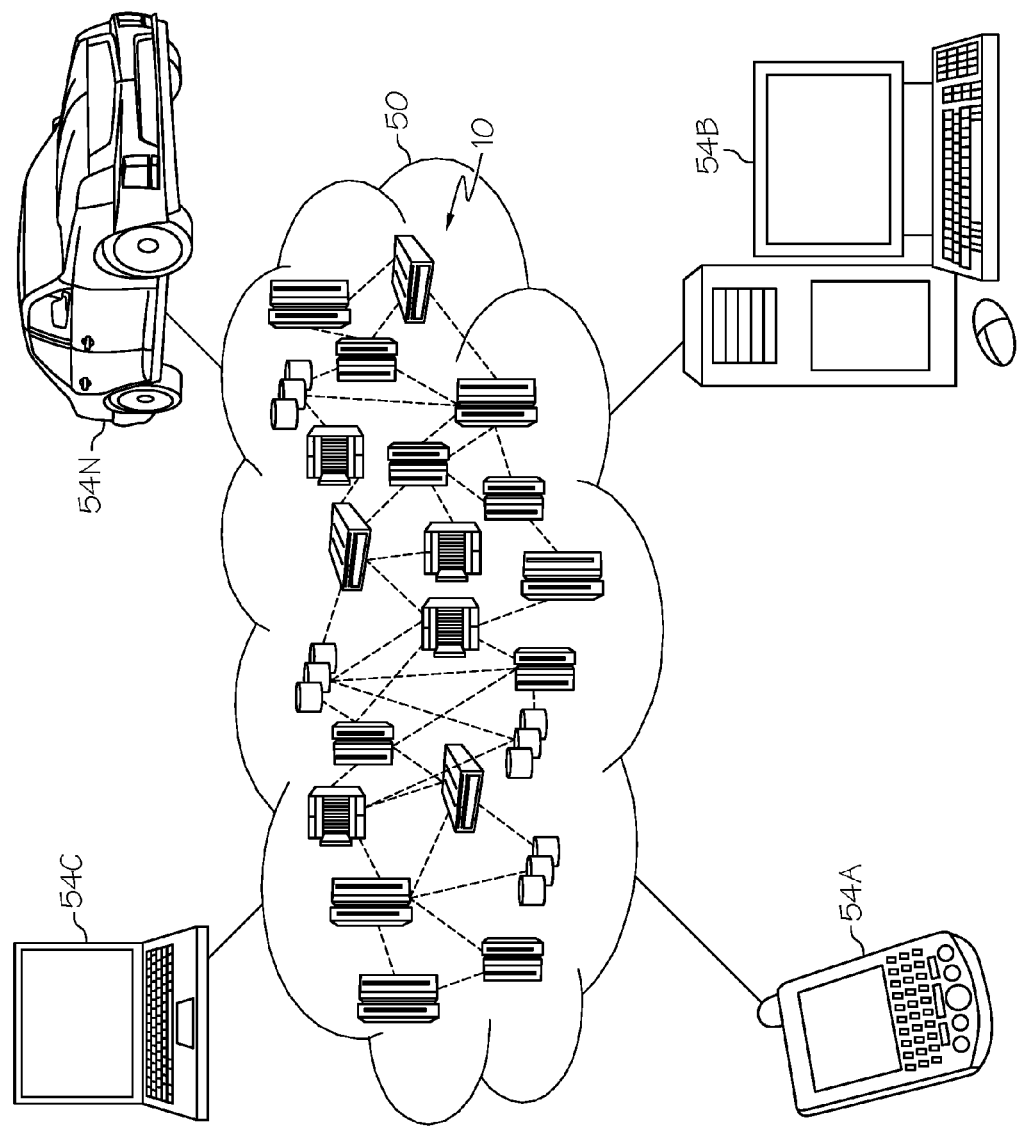
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
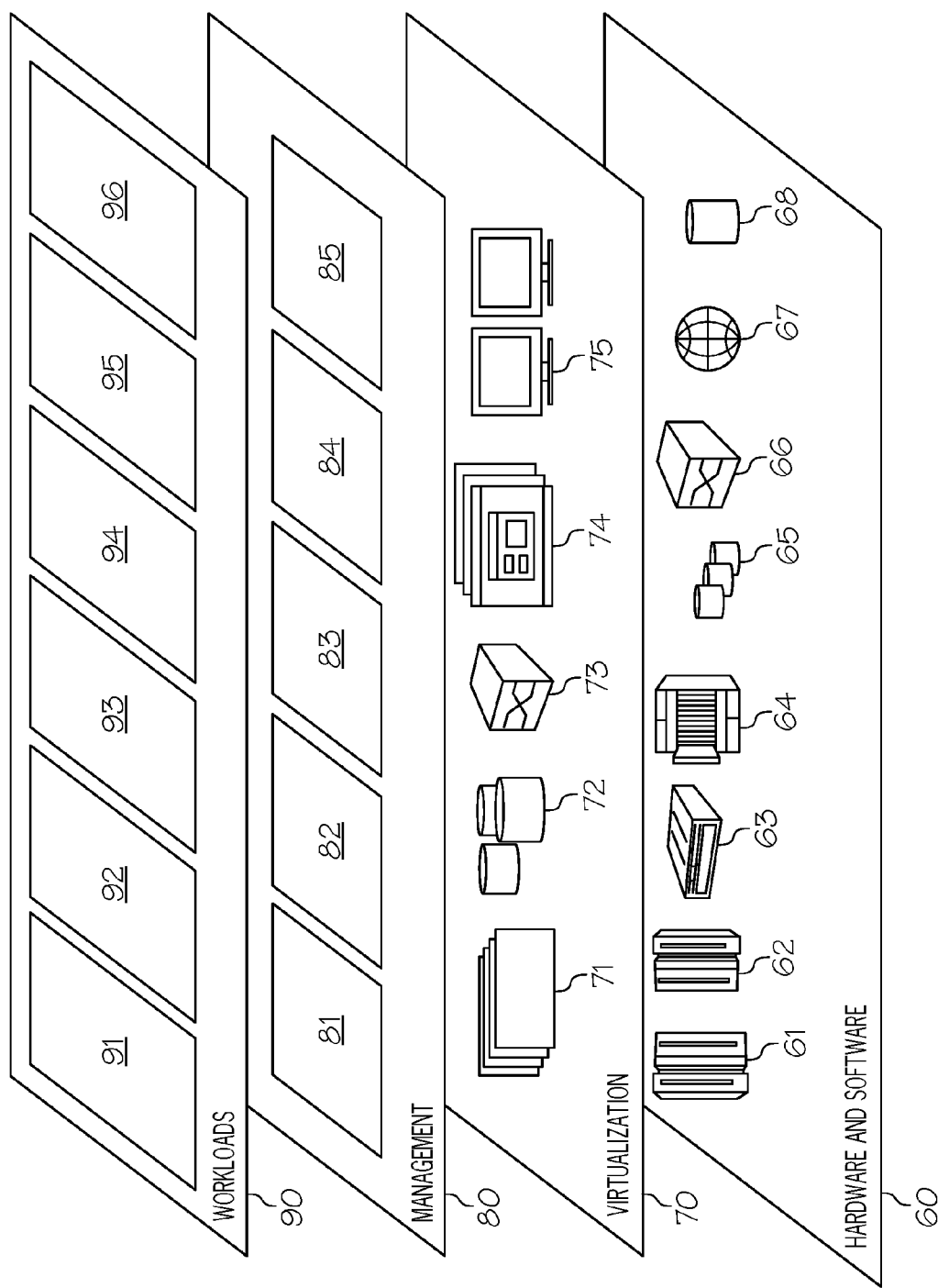
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and roadway access processing 96 (for selectively permitting access to a certain roadway as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of selectively controlling a self-driving vehicle's access to a roadway, the processor-implemented method comprising:
   receiving, by a vehicle interrogation hardware device, an autonomous capability signal from an approaching self-driving vehicle, wherein the approaching self-driving vehicle is approaching an access-controlled roadway, wherein access to the access-controlled roadway is limited to self-driving vehicles that are deemed qualified to travel on the access-controlled roadway, and wherein the autonomous capability signal describes a level of autonomous capability of the approaching self-driving vehicle for maneuvering through predefined roadway conditions;
   comparing, by one or more processors, the predefined roadway conditions to current roadway conditions of the access-controlled roadway;
   in response to the predefined roadway conditions matching the current roadway conditions of the access-controlled roadway within a predetermined range, determining, by one or more processors, whether the level of autonomous capability of the approaching self-driving vehicle is adequate to safely maneuver the approaching self-driving vehicle through the current roadway conditions of the access-controlled roadway; and
   in response determining that the level of autonomous capability of the self-driving vehicle is adequate to safely maneuver the approaching self-driving vehicle through the current roadway conditions of the access-controlled roadway, positioning, by an automatic barricade controlling device, an automatic barricade to provide the approaching self-driving vehicle with access to the access-controlled roadway, wherein the automatic barricade is a physical barricade that is positioned at an entrance of the access-controlled roadway.

2. The processor-implemented method of claim 1, further comprising:
   determining, by the vehicle interrogation hardware device, that another approaching vehicle is operating in manual mode; and
   in response to determining that said another approaching vehicle is operating in manual mode, positioning, by the automatic barricade controlling device, the automatic barricade to block said another approaching vehicle from accessing the access-controlled roadway.

3. The processor-implemented method of claim 1, wherein the access-controlled roadway is a vehicular surface from a group consisting of street, a tunnel, a ferry, a parking spot, and a service bay.

4. The processor-implemented method of claim 1, further comprising:
   receiving, by one or more processors, sensor readings from sensors that monitor the access-controlled roadway, wherein the sensor readings describe a current real-time condition of the access-controlled roadway; and
   determining, by one or more processors, the current roadway conditions based on the received sensor readings.

5. The processor-implemented method of claim 1, further comprising:
   receiving, by the vehicle interrogation hardware device, a description of a physical state of the approaching self-driving vehicle;
   retrieving, by one or more processors, an accident history of other vehicles that have a same physical state as that of the approaching self-driving vehicle while traveling on the access-controlled roadway;
   determining, by one or more processors, whether the accident history of the other vehicles traveling on the access-controlled roadway exceeds a predetermined limit; and
   in response to the one or more processors determining that the accident history of the other vehicles exceeds the predetermine limit while traveling on the access-controlled roadway, positioning, by the automatic barricade controlling device, the automatic barricade to block the approaching self-driving vehicle from accessing the access-controlled roadway.

6. The processor-implemented method of claim 1, wherein the current roadway conditions of the access-controlled roadway comprise a curve radius of a curve in the access-controlled roadway being less than a predefined value.

7. The processor-implemented method of claim 1, wherein the current roadway conditions of the access-controlled roadway comprise an absence of guardrails on one or more sections of the access-controlled roadway.

8. A computer program product for selectively controlling a self-driving vehicle's access to a roadway, the computer program product comprising a non-transitory computer readable storage medium having program code embodied therewith, the program code readable and executable by a processor to perform a method comprising:
   receiving an autonomous capability signal from an approaching self-driving vehicle, wherein the approaching self-driving vehicle is approaching an access-controlled roadway, wherein access to the access-controlled roadway is limited to self-driving vehicles that are deemed qualified to travel on the access-controlled roadway, and wherein the autonomous capability signal describes a level of autonomous capability of the approaching self-driving vehicle for maneuvering through predefined roadway conditions;
   comparing the predefined roadway conditions to current roadway conditions of the access-controlled roadway;
   in response to the predefined roadway conditions matching the current roadway conditions of the access-controlled roadway within a predetermined range, determining whether the level of autonomous capability of the approaching self-driving vehicle is adequate to safely maneuver the approaching self-driving vehicle through the current roadway conditions of the access-controlled roadway; and
   in response to determining that the level of autonomous capability of the self-driving vehicle is adequate to safely maneuver the approaching self-driving vehicle through the current roadway conditions of the access-controlled roadway, positioning, via an automatic barricade controlling device, an automatic barricade to provide the approaching self-driving vehicle with access to the access-controlled roadway, wherein the automatic barricade is a physical barricade that is positioned at an entrance of the access-controlled roadway.

9. The computer program product of claim 8, wherein the method further comprises:

determining that another approaching vehicle is operating in manual mode; and in response to determining that said another approaching vehicle is operating in manual mode, positioning, via the automatic barricade controlling device, the automatic barricade to block said another approaching vehicle from accessing the access-controlled roadway.

10. The computer program product of claim 8, wherein the access-controlled roadway is a vehicular surface from a group consisting of a ferry, a parking spot, and a service bay.

11. The computer program product of claim 8, wherein the method further comprises:

receiving sensor readings from sensors that monitor the access-controlled roadway, wherein the sensor readings describe a current real-time condition of the access-controlled roadway; and determining the current roadway conditions based on the received sensor readings.

12. The computer program product of claim 8, wherein the method further comprises:

receiving a description of a physical state of the approaching self-driving vehicle;

retrieving an accident history of other vehicles that have a same physical state as that of the approaching self-driving vehicle while traveling on the access-controlled roadway;

determining whether the accident history of the other vehicles traveling on the access-controlled roadway exceeds a predetermined limit; and in response to determining that the accident history of the other vehicles exceeds the predetermine limit while traveling on the access-controlled roadway, positioning, via the automatic barricade controlling device, the automatic barricade to block the approaching self-driving vehicle from accessing the access-controlled roadway.

13. The computer program product of claim 8, wherein the current roadway conditions of the access-controlled roadway comprise a curve radius of a curve in the access-controlled roadway being less than a predefined value.

14. The computer program product of claim 8, wherein the current roadway conditions of the access-controlled roadway comprise an absence of guardrails on one or more sections of the access-controlled roadway.

15. A roadway access-controlling station comprising:
a supervisory computer;
a vehicle interrogation hardware device; and
an automatic barricade controlling device,
wherein the vehicle interrogation hardware device receives an autonomous capability signal from an approaching self-driving vehicle, wherein the approaching self-driving vehicle is approaching an access-controlled roadway, wherein access to the access-controlled roadway is limited to self-driving vehicles that are deemed qualified to travel on the access-controlled roadway, and wherein the autonomous capability signal describes a level of autonomous capability of the approaching self-driving vehicle for maneuvering through predefined roadway conditions;

wherein the supervisory computer compares the predefined roadway conditions to current roadway conditions of the access-controlled roadway;

wherein the supervisory computer, in response to the predefined roadway conditions matching the current roadway conditions of the access-controlled roadway within a predetermined range, determines whether the level of autonomous capability of the approaching self-driving vehicle is adequate to safely maneuver the approaching self-driving vehicle through the current roadway conditions of the access-controlled roadway; and wherein the automatic barricade controlling device, in response the supervisory computer determining that the level of autonomous capability of the self-driving vehicle is adequate to safely maneuver the approaching self-driving vehicle through the current roadway conditions of the access-controlled roadway, positions an automatic barricade to provide the approaching self-driving vehicle with access to the access-controlled roadway, wherein the automatic barricade is a physical barricade that is positioned at an entrance of the access-controlled roadway.

16. The roadway access-controlling station of claim 15, wherein:

the vehicle interrogation hardware device determines that another approaching vehicle is operating in manual mode; and wherein in response to the vehicle interrogation hardware device determining that said another approaching vehicle is operating in manual mode, the automatic barricade controlling device positions the automatic barricade to block said another approaching vehicle from accessing the access-controlled roadway.

17. The roadway access-controlling station of claim 15, wherein the access-controlled roadway is a vehicular surface from a group consisting of a tunnel, a ferry, and a parking spot.

18. The roadway access-controlling station of claim 15, wherein:

the supervisory computer receives sensor readings from sensors that monitor the access-controlled roadway, wherein the sensor readings describe a current real-time condition of the access-controlled roadway; and wherein the supervisory computer determines the current roadway conditions based on the received sensor readings.

19. The roadway access-controlling station of claim 15, wherein the current roadway conditions of the access-controlled roadway comprise a curve radius of a curve in the access-controlled roadway being less than a predefined value.

20. The roadway access-controlling station of claim 15, wherein the current roadway conditions of the access-controlled roadway comprise an absence of guardrails on one or more sections of the access-controlled roadway.

* * * * *